United States Patent
Segawa

(10) Patent No.: US 11,326,615 B2
(45) Date of Patent: May 10, 2022

(54) SEAL STRUCTURE OF VARIABLE NOZZLE UNIT, AND VARIABLE CAPACITY TYPE TURBOCHARGER

(71) Applicant: IHI Corporation, Koto-ku (JP)

(72) Inventor: Kenichi Segawa, Koto-ku (JP)

(73) Assignee: IHI Corporation, Koto-ku (JP)

( * ) Notice: Subject to any disclaimer, the term of this patent is extended or adjusted under 35 U.S.C. 154(b) by 79 days.

(21) Appl. No.: 16/494,641

(22) PCT Filed: Mar. 14, 2018

(86) PCT No.: PCT/JP2018/009979
§ 371 (c)(1),
(2) Date: Sep. 16, 2019

(87) PCT Pub. No.: WO2018/168931
PCT Pub. Date: Sep. 20, 2018

(65) Prior Publication Data
US 2020/0018319 A1 Jan. 16, 2020

(30) Foreign Application Priority Data
Mar. 17, 2017 (JP) .............................. JP2017-053401

(51) Int. Cl.
*F01D 11/00* (2006.01)
*F01D 17/16* (2006.01)
(Continued)

(52) U.S. Cl.
CPC .......... *F04D 29/083* (2013.01); *F01D 11/005* (2013.01); *F01D 17/165* (2013.01);
(Continued)

(58) Field of Classification Search
CPC ...... F01D 11/005; F01D 17/165; F02B 37/24; F04D 29/083; F05D 2220/40
See application file for complete search history.

(56) References Cited

U.S. PATENT DOCUMENTS

| 2,860,827 A | 11/1958 | Egli |
| 8,763,393 B2 | 7/2014 | Severin et al. |
| (Continued) | | |

FOREIGN PATENT DOCUMENTS

| CN | 101529064 A | 9/2009 |
| CN | 101946069 A | 1/2011 |
| (Continued) | | |

OTHER PUBLICATIONS

International Search Report dated May 1, 2018 in PCT/JP2018/009979, 3 page (with English Translation).

*Primary Examiner* — Audrey B. Walter
(74) *Attorney, Agent, or Firm* — Oblon, McClelland, Maier & Neustadt, L.L.P.

(57) ABSTRACT

A seal structure includes a cylindrical outlet wall portion which forms an outlet passage at a downstream side of a turbine wheel and an annular shroud portion which is provided in a second nozzle ring and faces a blade portion. A proximal end portion of the outlet wall portion and a distal end portion of the shroud portion face each other with a gap interposed therebetween in an axial direction. An annular seal member is disposed at an inner peripheral portion of the gap in a radial direction. The seal member comes into contact with the proximal end portion of the outlet wall portion and the distal end portion of the shroud portion to block the gap.

13 Claims, 7 Drawing Sheets

(51) Int. Cl.
*F04D 29/08* (2006.01)
*F02B 37/24* (2006.01)

(52) U.S. Cl.
CPC .......... *F02B 37/24* (2013.01); *F05B 2240/57* (2013.01); *F05D 2220/40* (2013.01)

(56) References Cited

U.S. PATENT DOCUMENTS

| | | |
|---|---|---|
| 2010/0064684 A1 | 3/2010 | Nishiyama et al. |
| 2010/0218498 A1 | 9/2010 | Shibui et al. |
| 2010/0310365 A1 | 12/2010 | Matsuyama et al. |
| 2013/0036733 A1* | 2/2013 | Severin ................ F01D 17/165 60/605.1 |
| 2013/0149129 A1 | 6/2013 | Matsuyama et al. |
| 2014/0241858 A1* | 8/2014 | Tashiro ................ F04D 29/083 415/111 |
| 2016/0265379 A1* | 9/2016 | Annati .................... F01D 9/045 |
| 2017/0058764 A1 | 3/2017 | Bayod et al. |
| 2018/0030848 A1* | 2/2018 | Kobayashi ........... F01D 17/146 |
| 2018/0230851 A1* | 8/2018 | Katou ..................... F01D 9/026 |

FOREIGN PATENT DOCUMENTS

| | | | |
|---|---|---|---|
| CN | 102762838 A | 10/2012 | |
| CN | 103711528 A | 4/2014 | |
| DE | 1 033 965 | 7/1958 | |
| DE | 10 2004 039 477 A1 | 2/2006 | |
| DE | 10 2004 039 473 A1 | 3/2006 | |
| JP | 5-214949 A | 8/1993 | |
| JP | 10-110622 A | 4/1998 | |
| JP | 11-229886 A | 8/1999 | |
| JP | 11-229887 A | 8/1999 | |
| JP | 2008-19798 A | 1/2008 | |
| JP | 2010-1863 A | 1/2010 | |
| JP | 2013-2293 A | 1/2013 | |
| JP | 2013-104413 A | 5/2013 | |
| WO | WO 2007/141968 A1 | 12/2007 | |
| WO | WO 2008/053771 A1 | 5/2008 | |
| WO | WO 2009/104232 A1 | 8/2009 | |
| WO | WO 2015/190470 A1 | 12/2015 | |
| WO | WO-2016079872 A1 * | 5/2016 | ............. F01D 9/041 |
| WO | WO 2016/159004 A1 | 10/2016 | |

* cited by examiner

SEAL STRUCTURE OF VARIABLE NOZZLE UNIT, AND VARIABLE CAPACITY TYPE TURBOCHARGER

TECHNICAL FIELD

The disclosure relates to a seal structure of a variable nozzle unit and a variable capacity type turbocharger.

BACKGROUND ART

In a variable capacity type turbocharger, a variable nozzle unit disposed between a turbine wheel and a scroll passage inside a turbine housing is known. For example, a variable nozzle unit described in Patent Document 1 includes two nozzle rings and a variable nozzle disposed between the nozzle rings. The first nozzle ring is disposed near a compressor in the axial direction of the turbine wheel. The second nozzle ring is disposed to face the first nozzle ring while being separated therefrom in the axial direction. The second nozzle ring faces a blade portion (a tip of a blade portion) of the turbine wheel.

CITATION LIST

Patent Literature

Patent Document 1: International Publication WO 2007/141968

SUMMARY OF INVENTION

Technical Problem

The nozzle ring facing the blade portion of the turbine wheel is also called a shroud ring. The shroud ring faces a cylindrical wall portion which forms an outlet passage of the turbine housing. The shroud ring and the wall portion face each other with a gap interposed therebetween in the axial direction. The outer peripheral portion of the gap faces the scroll passage. The inner peripheral portion of the gap faces a downstream region of the blade portion (the tip) of the turbine wheel or the blade portion (the tip) of the turbine wheel. Thus, the gap can connect the scroll passage and the outlet passage. When a gas passes through the gap, the gas bypasses the variable nozzle and the turbine wheel. The bypassing of the gas can cause deterioration of turbine performance.

The disclosure will describe a seal structure of a variable nozzle unit and a variable capacity type turbocharger capable of improving sealing performance between a turbine housing and a nozzle ring facing a blade portion of a turbine wheel.

Solution to Problem

According to an aspect of the disclosure, there is provided a seal structure of a variable nozzle unit that is disposed between a turbine wheel and a scroll passage inside a turbine housing, the variable nozzle unit including a first nozzle ring which is disposed near a compressor in relation to a blade portion of the turbine wheel in an axial direction of the turbine wheel inside the turbine housing, a second nozzle ring which is disposed to face the scroll passage and to face the first nozzle ring in the axial direction inside the turbine housing, and a plurality of variable nozzles which are disposed between the first nozzle ring and the second nozzle ring, the seal structure including: a cylindrical outlet wall portion which is provided in the turbine housing and forms an outlet passage at the downstream side of the turbine wheel; an annular shroud portion which is provided in the second nozzle ring to face the blade portion, wherein a proximal end portion of the outlet wall portion and a distal end portion of the shroud portion face each other with a gap interposed therebetween in the axial direction; and an annular seal member that is disposed at an inner peripheral portion of the gap in a radial direction and comes into contact with the proximal end portion of the outlet wall portion and the distal end portion of the shroud portion to block the gap.

Effects of Invention

According to an aspect of the disclosure, it is possible to improve sealing performance between the turbine housing and the second nozzle ring including the shroud portion.

DESCRIPTION OF EMBODIMENTS

Figure 1:
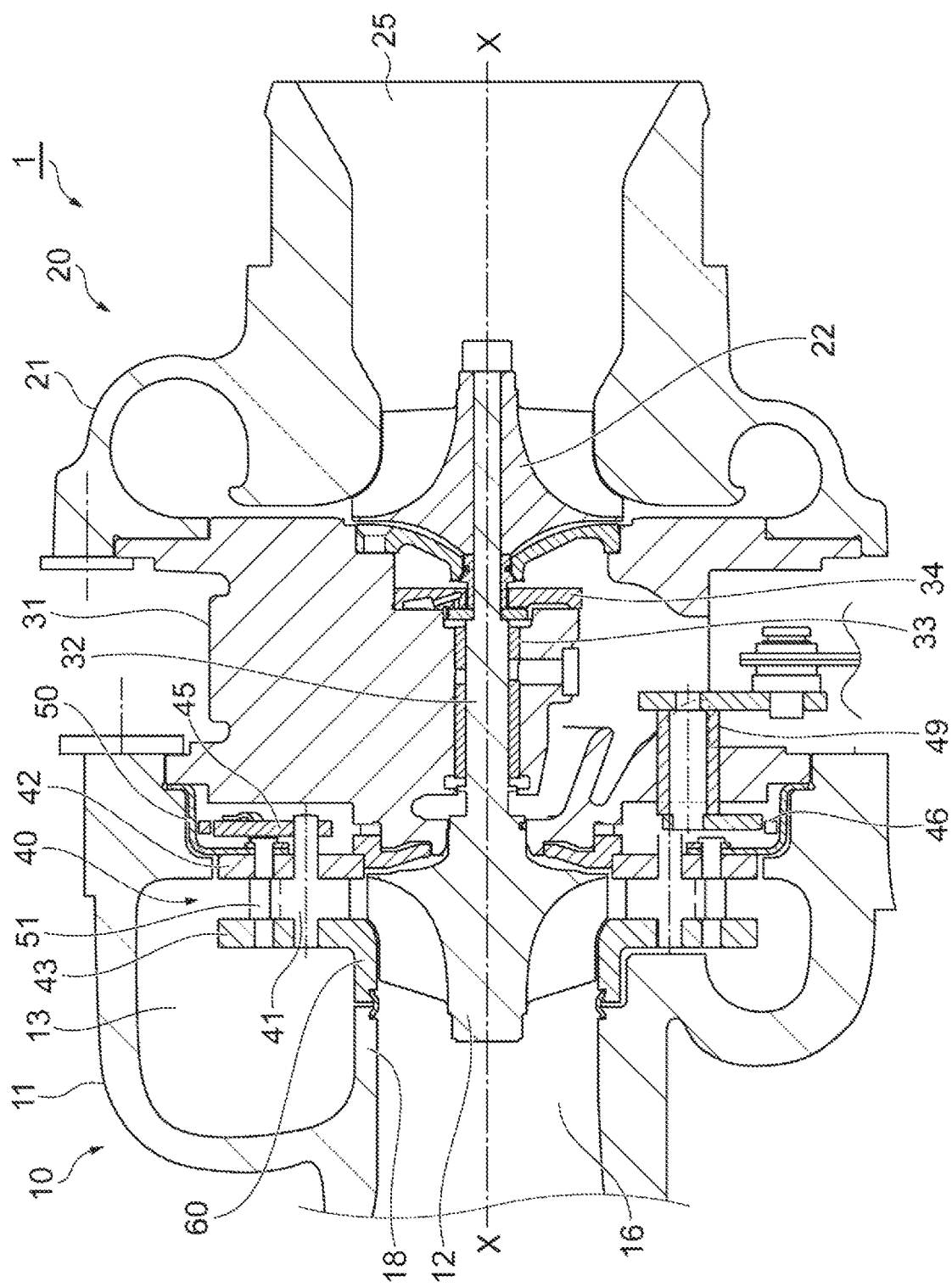
FIG. 1 is a cross-sectional view illustrating a variable capacity type turbocharger according to an embodiment of the disclosure.

An aspect of the disclosure provides a seal structure of a variable nozzle unit that is disposed between a turbine wheel and a scroll passage inside a turbine housing, the variable nozzle unit including a first nozzle ring which is disposed near a compressor in relation to a blade portion of the turbine wheel in an axial direction of the turbine wheel inside the turbine housing, a second nozzle ring which is disposed to face the scroll passage and to face the first nozzle ring in the axial direction inside the turbine housing, and a plurality of variable nozzles which are disposed between the first nozzle ring and the second nozzle ring, the seal structure including: a cylindrical outlet wall portion which is provided in the turbine housing and forms an outlet passage at the downstream side of the turbine wheel; an annular shroud portion which is provided in the second nozzle ring to face the blade portion, wherein a proximal end portion of the outlet wall portion and a distal end portion of the shroud portion face each other with a gap interposed therebetween in the axial direction; and an annular seal member that is disposed at an inner peripheral portion of the gap in a radial direction and comes into contact with the proximal end portion of the outlet wall portion and the distal end portion of the shroud portion to block the gap.

According to the variable nozzle unit, a passage area of a gas (an exhaust gas or the like) between the first nozzle ring and the second nozzle ring can be changed by the variable nozzle. The distal end portion of the shroud portion of the second nozzle ring and the proximal end portion of the outlet wall portion of the turbine housing face each other with the gap interposed therebetween in the axial direction. Since the outer peripheral portion of the gap faces the scroll passage, a gas coming out of the scroll passage can intrude into the gap. When the intruding gas passes through the gap, the gas bypasses the variable nozzle and the turbine wheel. However, according to the seal structure, the annular seal member is disposed at the inner peripheral portion of the gap. Since the seal member comes into contact with the proximal end portion of the outlet wall portion and the distal end portion of the shroud portion to block the gap, it is possible to prevent the gas from passing through the gap at the inner peripheral portion. Thus, it is possible to improve sealing performance between the second nozzle ring and the turbine housing.

In some aspects, the seal member is welded to the proximal end portion of the outlet wall portion and the distal end portion of the shroud portion. According to this configuration, it is possible to reliably exhibit a sealing effect by the seal member in both of the outlet wall portion and the shroud portion. Thus, sealing performance is further improved.

In some aspects, the distal end portion of the shroud portion protrudes toward the downstream side in the axial direction in relation to a shroud end of a trailing edge of the blade portion, and the seal member is located at the downstream side in relation to the shroud end. According to this configuration, the seal portion is not provided in a region facing the tip of the blade portion. Since the seal member is located at the downstream side in relation to the shroud end of the trailing edge of the blade portion, a leakage flow which is generated in the region facing the tip of the blade portion is not easily influenced by the shape of the position provided with the seal member. Accordingly, performance deterioration is prevented and an adverse influence on aerodynamic performance is reduced.

In some aspects, at least one of an inner peripheral surface of the proximal end portion of the outlet wall portion and an inner peripheral surface of the distal end portion of the shroud portion is provided with a recess and at least a part of the seal member is disposed in the recess. According to this configuration, since the seal member intrudes into the recess, a flow coming out of the turbine wheel is not disturbed. Accordingly, performance deterioration is prevented and an adverse influence on aerodynamic performance is reduced.

In some aspects, the recess is provided with a convex portion which protrudes inward in the radial direction. According to this configuration, since the seal member comes into contact with the convex portion and the seal member also comes into contact with the bottom portion of the recess, a sealing effect by the seal member is reliably exhibited. Thus, sealing performance is further improved.

Another aspect of the disclosure provides a variable capacity type turbocharger including any one of the seal structures of the variable nozzle units and the variable nozzle unit is attached into the turbine housing with the seal structure. According to the variable capacity type turbocharger, it is possible to suppress the bypassing of the gas in accordance with the improvement of the sealing performance. As a result, deterioration of turbine performance is suppressed.

Hereinafter, an embodiment of the disclosure will be described with reference to the drawings. Furthermore, in the description of the drawings, the same reference numerals will be given to the same components and a repetitive description thereof will be omitted.

Referring to FIG. 1, a variable capacity type turbocharger according to an embodiment of the disclosure will be described. As illustrated in FIG. 1, a variable capacity type turbocharger 1 includes a turbine 10 and a compressor 20 (a centrifugal compressor). The turbine 10 includes a turbine housing 11 and a turbine wheel 12 accommodated in the turbine housing 11. The compressor 20 includes a compressor housing 21 and a compressor wheel 22 accommodated in the compressor housing 21. The turbine wheel 12 is provided at a first end of a rotation shaft 32 extending in the axial direction X and the compressor wheel 22 is provided at a second end of the rotation shaft 32.

A bearing housing 31 is provided between the turbine housing 11 and the compressor housing 21. The rotation shaft 32 is supported by the bearing housing 31 to be rotatable. The bearing housing 31 is provided with a radial bearing 33 and a pair of thrust bearings 34 supporting the rotation shaft 32 to be rotatable. The rotation shaft 32, the turbine wheel 12, and the compressor wheel 22 rotate as a single rotation body.

The turbine housing 11 is provided with an exhaust gas inlet passage (not illustrated) and an exhaust gas outlet passage 16. An exhaust gas which is discharged from an internal combustion engine (not illustrated) flows into a turbine scroll passage 13 provided inside the turbine housing 11 through the inlet passage to rotate the turbine wheel 12 and then is discharged to the outside of the turbine housing 11 through the outlet passage 16. Furthermore, in the present specification, for the flow of the exhaust gas inside the turbine housing 11, a side of the scroll passage 13 near the inlet passage will be described as "upstream" and a side of the turbine wheel 12 near the outlet passage 16 will be described as "downstream". That is, the expression of the "upstream" and the "downstream" is set with reference to the flow of the exhaust gas.

The compressor housing 21 is provided with an inlet passage 25 and an outlet passage (not illustrated). When the turbine wheel 12 rotates as described above, the compressor wheel 22 rotates through the rotation shaft 32. By the rotation of the compressor wheel 22, external air is intaked through the inlet passage 25, passes through the scroll passage, and is discharged from the outlet passage. The compressed air which is discharged from the outlet passage is supplied to the internal combustion engine.

A variable nozzle unit 40 which controls the passage area (flow amount) of the exhaust gas supplied to the turbine wheel 12 is provided inside the turbine housing 11. The variable nozzle unit 40 includes a plurality of variable nozzles 41 which are arranged at intervals in the circumferential direction around the axis X and a first nozzle ring 42 and a second nozzle ring 43 which are disposed at both sides of the variable nozzles 41 in the axial direction X. That is, the plurality of variable nozzles 41 are disposed between the first nozzle ring 42 and the second nozzle ring 43. The variable nozzle unit 40 further includes a plurality of link members 45 that are fixed to the plurality of variable nozzles 41 and extend outward in the radial direction and a drive ring 46 which engages with an outer end portion of the link member 45 in the radial direction. As understood from FIG. 1, the plurality of variable nozzles 41 are disposed in the exhaust gas passage between the first nozzle ring 42 and the second nozzle ring 43 at the outside of the turbine wheel 12 in the radial direction. The exhaust gas passage is a passage which is directed from the scroll passage 13 to the turbine wheel 12. The variable nozzle unit 40 is attached into the turbine housing 11 so that the first nozzle ring 42, the second nozzle ring 43, and the plurality of variable nozzles 41 are disposed as described above. The variable nozzle unit 40 is disposed between the scroll passage 13 and the turbine wheel 12 inside the turbine housing 11.

In the variable nozzle unit 40, the driving of a motor or a cylinder (not illustrated) is transmitted through a power transmission mechanism 49 to rotate the drive ring 46 in the circumferential direction so that the plurality of link members 45 respectively engaging with the drive ring 46 rotate in the circumferential direction. Accordingly, the plurality of variable nozzles 41 respectively fixed to the plurality of link members 45 rotate (swing). The variable nozzle unit 40 can control the flow amount of the exhaust gas from the upstream scroll passage 13 to the downstream turbine wheel 12 by controlling the rotation amount of the plurality of variable nozzles 41.

Figure 2:
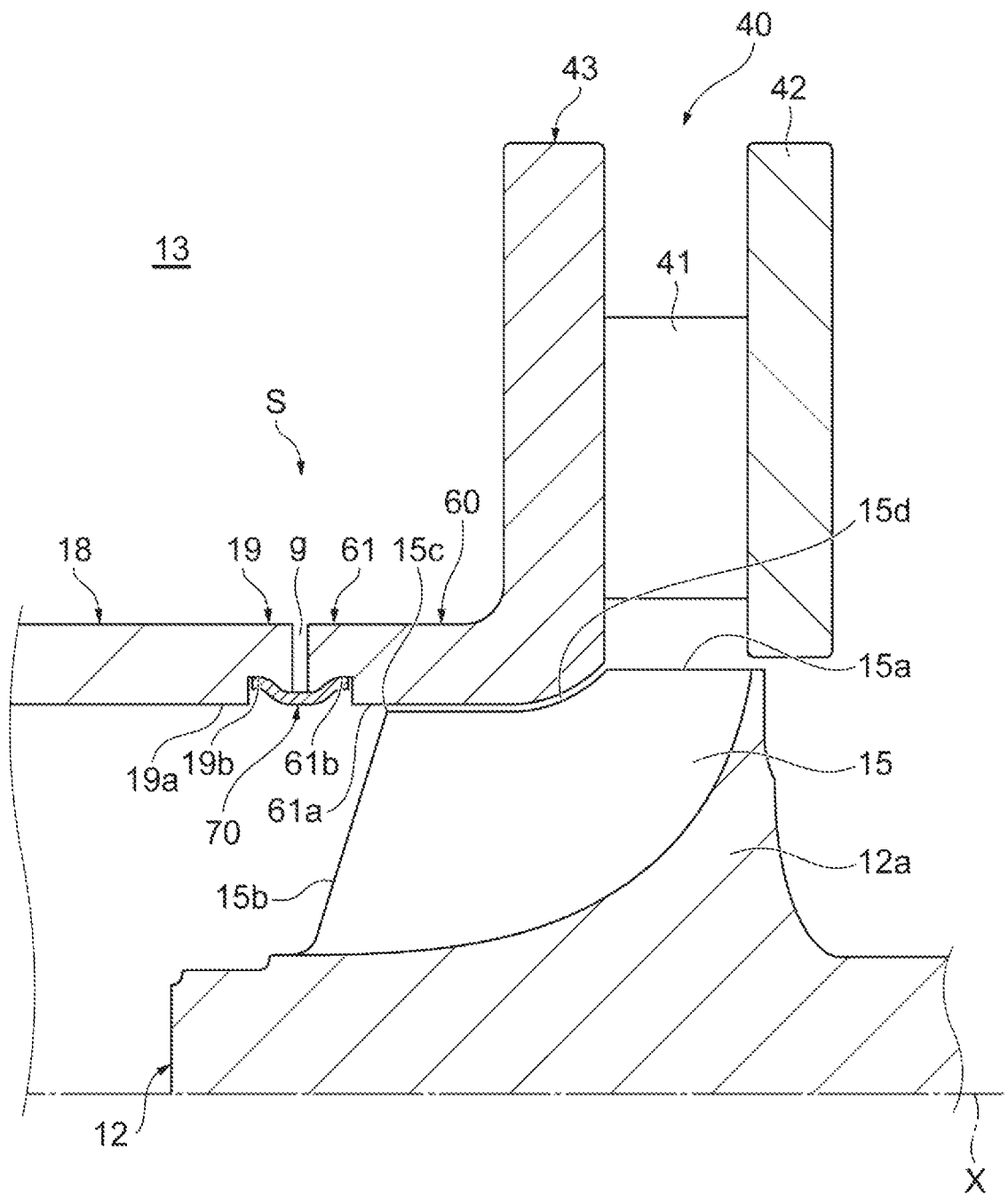
FIG. 2 is an enlarged cross-sectional view illustrating a seal structure and its peripheral portion in FIG. 1.

Referring to FIGS. 1 and 2, the variable nozzle unit 40 and a seal structure S of the variable nozzle unit 40 will be described. The variable capacity type turbocharger 1 includes the variable nozzle unit 40 which improves the sealing performance between the variable nozzle unit 40 and the turbine housing 11. In other words, the variable nozzle unit 40 is attached into the turbine housing 11.

As illustrated in FIG. 2, the turbine wheel 12 includes a hub portion 12a which extends to the periphery of the rotation shaft 32 and a plurality of blade portions 15 which extend from the hub portion 12a toward a first end side in the radial direction and the axial direction. The blade portion 15 has a three dimensional shape in response to the performance required for the turbine wheel 12. The blade portion 15 includes a leading edge 15a which faces the exhaust gas passage and a trailing edge 15b which faces the outlet passage 16. The blade portion 15 includes a curved tip 15d which is an edge portion provided between the leading edge 15a and the trailing edge 15b and provided near the second nozzle ring 43 (away from the hub portion 12a). The intersection point between the trailing edge 15b and the tip 15d is a shroud end 15c of the trailing edge 15b.

For example, the first nozzle ring 42 is provided near the bearing housing 31 in relation to the leading edge 15a of the turbine impeller 12 at the outside of the turbine impeller 12 in the radial direction. For example, the first nozzle ring 42 may be disposed near the compressor 20 from a position slightly overlapping the leading edge 15a of the turbine impeller 12 in the axial direction X. The second nozzle ring 43 is disposed to face the first nozzle ring 42 in the X-axis direction. The first nozzle ring 42 and the second nozzle ring 43 are connected to each other by a plurality of connection pins 51 (see FIG. 1) arranged at intervals in the circumferential direction about the axis X while being separated from each other by a predetermined distance. The first nozzle ring 42 may include a through-hole for supporting the variable nozzle 41. The second nozzle ring 43 may include a through-hole for supporting the variable nozzle 41. That is, the variable nozzle 41 may be supported at one end or both ends. Furthermore, in the drawings after FIG. 2, a configuration involved with a support structure of the variable nozzle 41 and the connection pin 51 are omitted.

As illustrated in FIG. 1, the first nozzle ring 42 is attached to a support ring 50 having an outer diameter larger than that of the first nozzle ring 42 at the side (the rear surface side) of the bearing housing 31 of the first nozzle ring 42. The outer edge of the support ring 50 is sandwiched by the turbine housing 11 and the bearing housing 31. Accordingly, the support ring 50 and the first nozzle ring 42 attached to the support ring 50 are attached to the turbine housing 11 and the bearing housing 31.

The seal structure S of the embodiment will be described. The turbine housing 11 includes a cylindrical outlet wall portion 18 which forms the outlet passage 16 at the downstream side of the turbine wheel 12. The scroll passage 13 is formed at the outer peripheral side of the outlet wall portion 18 and the outlet passage 16 is formed at the inner peripheral side of the outlet wall portion 18. The inner diameter of the outlet wall portion 18 may be gradually increased toward the downstream side. The shape of the outlet wall portion 18, that is, the shape of the outlet passage 16 can be appropriately changed. Furthermore, in the present specification, the expression of the "inner periphery" and the "outer periphery" is set with reference to the radial direction about the axis X.

Meanwhile, the second nozzle ring 43 of the variable nozzle unit 40 faces the scroll passage 13. More specifically, the second nozzle ring 43 includes a portion extending in the radial direction and a portion extending in the axial direction X. A cross-section of the second nozzle ring 43 cut along a plane including the axis X has an L shape. A portion extending in the radial direction of the second nozzle ring 43 faces the scroll passage 13. The second nozzle ring 43 includes an annular shroud portion 60 which faces the blade portion 15 of each turbine wheel 12. A predetermined clearance is formed between the shroud portion 60 and the tip 15d of the turbine impeller 12. The shroud portion 60 includes at least a part of the portion extending in the axis X.

The outlet wall portion 18 includes a cylindrical proximal end portion 19. The proximal end portion 19 is an end portion near the compressor 20 (near a second end portion in the axial direction X) in the outlet wall portion 18. Meanwhile, the shroud portion 60 includes a cylindrical distal end portion 61. The distal end portion 61 is an end portion near a first end portion in the axial direction X of the shroud portion 60 (the second nozzle ring 43). The proximal end portion 19 and the distal end portion 61 have, for example, substantially the same diameter. The inner diameter of the proximal end portion 19 may be substantially the same as the inner diameter of the distal end portion 61. The outer diameter of the proximal end portion 19 may be substantially the same as the outer diameter of the distal end portion 61. The proximal end portion 19 and the distal end portion 61 face each other with a gap g (see FIG. 2) interposed therebetween in the axial direction X. The inner peripheral portion of the gap g faces the outlet passage 16. Furthermore, the inner diameter may be gradually increased from the distal end portion 61 to the proximal end portion 19.

Here, a passage cross-section of the scroll passage 13 is formed so that an area gradually decreases, for example, from the upstream toward the downstream. As illustrated in FIG. 1, a part of the scroll passage 13 is formed by the second nozzle ring 43 including the shroud portion 60 and the outlet wall portion 18 in a region in which the cross-sectional area of the scroll passage 13 is large. The outer peripheral portion of the gap g faces (communicates with) the scroll passage 13. In a region in which the cross-sectional area of the scroll passage 13 is small, only a part of the second nozzle ring 43 faces the scroll passage 13. The other portions of the second nozzle ring 43 face the turbine housing 11. For example, a part of the portion extending in the radial direction and the outer peripheral surface of the shroud portion 60 in the second nozzle ring 43 faces the turbine housing 11 so that an L-shaped gap is formed between the second nozzle ring 43 and the turbine housing 11. The L-shaped gap may be formed only in a part or the circumferential direction, that is, a region in which the cross-sectional area of the scroll passage 13 is small. The gap g in the region in which the cross-sectional area of the scroll passage 13 is small communicates with the L-shaped gap and the outer peripheral portion of the L-shaped gap faces (communicates with) the scroll passage 13.

As illustrated in FIG. 2, the distal end portion 61 of the shroud portion 60 protrudes toward the downstream side in the axis X in relation to the shroud end 15c of the trailing edge 15b of the turbine impeller 12. In other words, the shroud portion 60 of the second nozzle ring 43 faces the entire region of the tip 15d.

An inner peripheral surface 19a of the proximal end portion 19 of the outlet wall portion 18 and an inner peripheral surface 61a of the distal end portion 61 of the shroud portion 60 are located on, for example, the same circumferential surface. That is, a virtual extended plane of the inner peripheral surface 19a and a virtual extended plane of the inner peripheral surface 61a substantially match each other. The inner peripheral surface 19a is provided with an annular recess 19b. The inner peripheral surface 61a is provided with an annular recess 61b. The recess 19b provided in the outlet wall portion 18 and the recess 61b provided in the shroud portion 60 have substantially the same depth.

An annular seal member 70 is disposed inside the recess 19b and the recess 61b. The seal member 70 is a cylindrical member and has a predetermined length in the axial direction X. The seal member 70 comes into contact with the inner peripheral surface 19a of the proximal end portion 19 of the outlet wall portion 18 and the inner peripheral surface 61a of the distal end portion 61 of the shroud portion 60. More specifically, the seal member 70 comes into contact with the bottom portion of the recess 19b and the bottom portion of the recess 61b. In this way, the seal member 70 is disposed across the outlet wall portion 18 and the shroud portion 60. In the embodiment, the bottom portion of the recess 19b is a part of the inner peripheral surface 19a and the bottom portion of the recess 61b is a part of the inner peripheral surface 61a.

The seal member 70 is disposed at the inner peripheral portion of the gap g and blocks the gap g. The seal member 70 is, for example, a ring member that is continuous in the range of 360° without any break. Thus, the seal member 70 blocks the entire region (the entire circumference) of the inner peripheral portion of the gap g. The seal member 70 is able to seal the gap g. Accordingly, the amount of the exhaust gas passing through the gap g, that is, the leaking or bypassing amount of the exhaust gas is substantially zero. The seal structure S of the embodiment includes the outlet wall portion 18 of the turbine housing 11, the shroud portion 60 of the second nozzle ring 43, and the seal member 70.

The arrangement, structure, and attachment method of the seal member 70 will be described in detail. Since the distal end portion 61 of the shroud portion 60 protrudes toward the downstream side in relation to the shroud end 15c of the trailing edge 15b, the gap g, the recess 19b, and the recess 61b are located at the downstream side in relation to the shroud end 15c. Thus, the seal member 70 is located at the downstream side in relation to the shroud end 15c.

The seal member 70 is welded to the proximal end portion 19 of the outlet wall portion 18 and the distal end portion 61 of the shroud portion 60. More specifically, the outer peripheral surface of the seal member 70 is welded to the inner peripheral surface 19a of the proximal end portion 19 and the inner peripheral surface 61a of the distal end portion 61 and is integrated across the inner peripheral surface 19a and the inner peripheral surface 61a. Accordingly, the outlet wall portion 18 and the shroud portion 60 are reliably sealed by the seal member 70. The seal member 70 improves the sealing performance between the variable nozzle unit 40 and the turbine housing 11. Meanwhile, the inner peripheral surface of the seal member 70 faces the outlet passage 16.

The seal member 70 is formed of, for example, heat-resistant stainless steel. The seal member 70 may be formed of heat-resistant superalloy. Meanwhile, the second nozzle ring 43 of the variable nozzle unit 40 may be also formed of heat-resistant stainless steel. The turbine housing 11 may be formed of heat-resistant and/or oxidation-resistant cast steel. The linear expansion coefficient of the turbine housing 11 may be similar to the linear expansion coefficients of the seal member 70 and the second nozzle ring 43. Furthermore, the turbine housing 11 may be formed of cast iron.

Figure 3A:
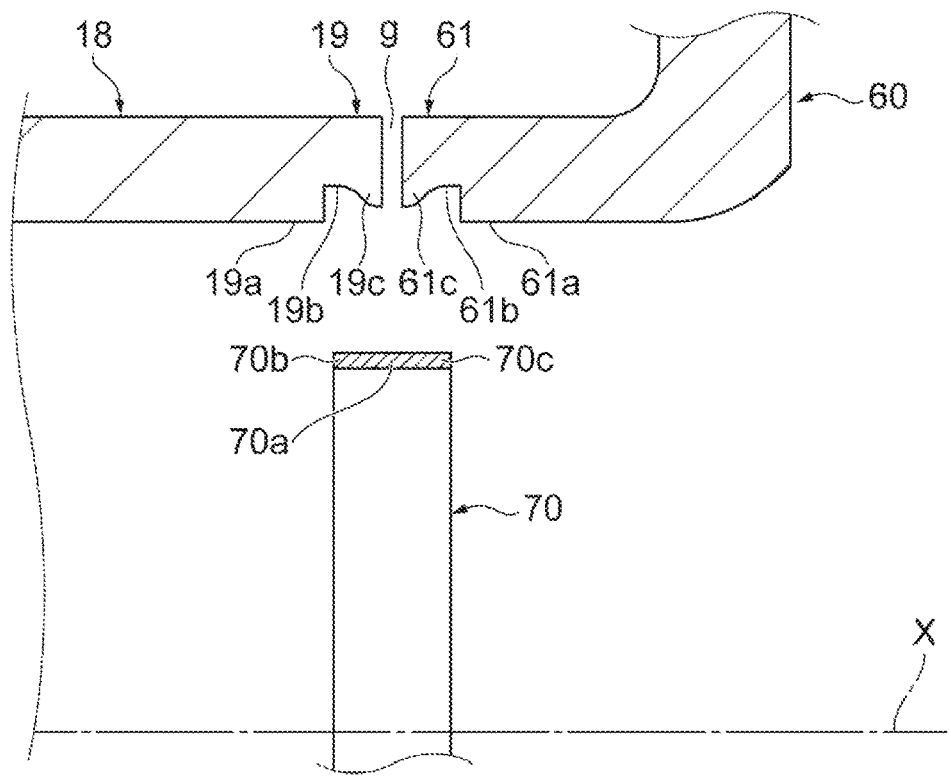
FIGS. 3A and 3B are cross-sectional views illustrating an example of a method of manufacturing a seal structure.

When the seal member 70 is attached by welding, the seal member 70 can be attached according to, for example, an electromagnetic welding method (an electromagnetic forming method). In that case, the seal member 70 may be formed of a ductile material. In a case in which the seal member 70 is welded according to the electromagnetic welding method, a cylindrical member (seal member 70) having an outer diameter smaller than the inner diameter of the recess 19b of the inner peripheral surface 19a or the inner diameter of the recess 61b of the inner peripheral surface 61a is prepared as illustrated in FIG. 3A. The cylindrical member is disposed at a predetermined position about the axis X and an electromagnetic tool including an electromagnetic induction coil is disposed in the vicinity of the cylindrical member. Then, electromagnetic energy is given to the cylindrical member so as to increase the outer diameter of the cylindrical member.

Figure 3B:
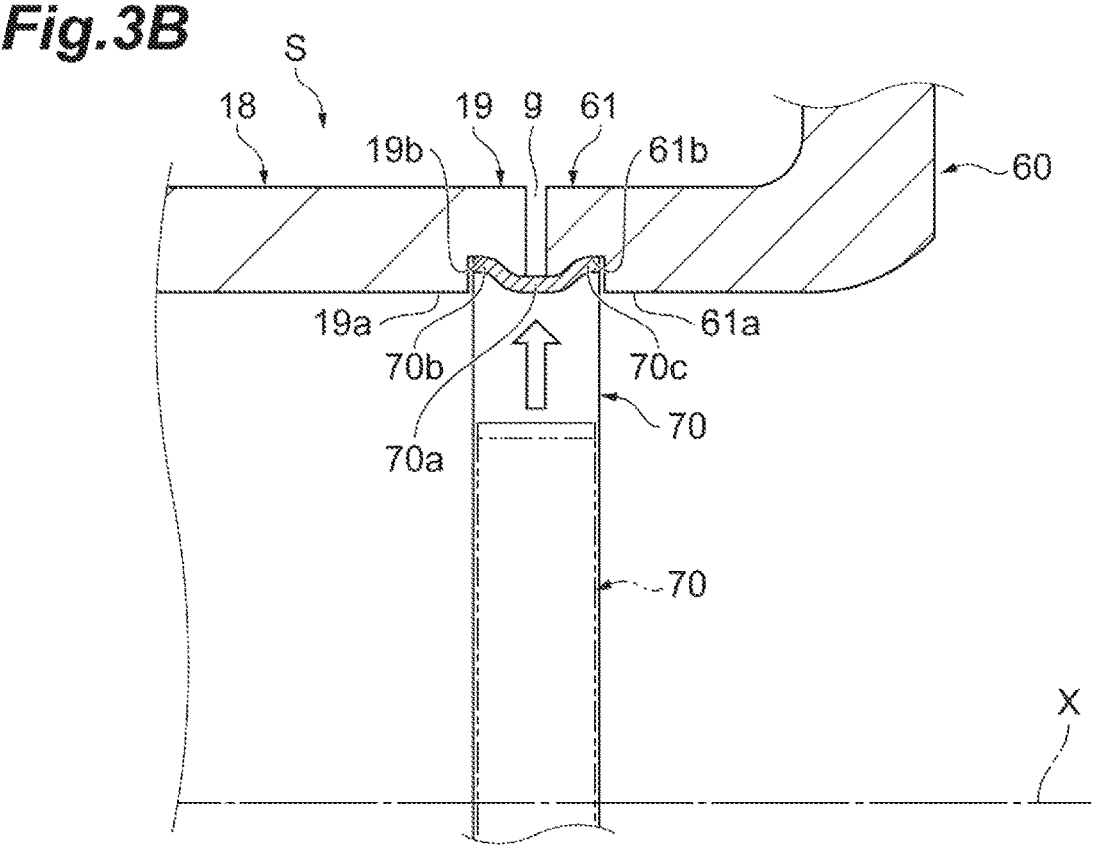
Figure 7:
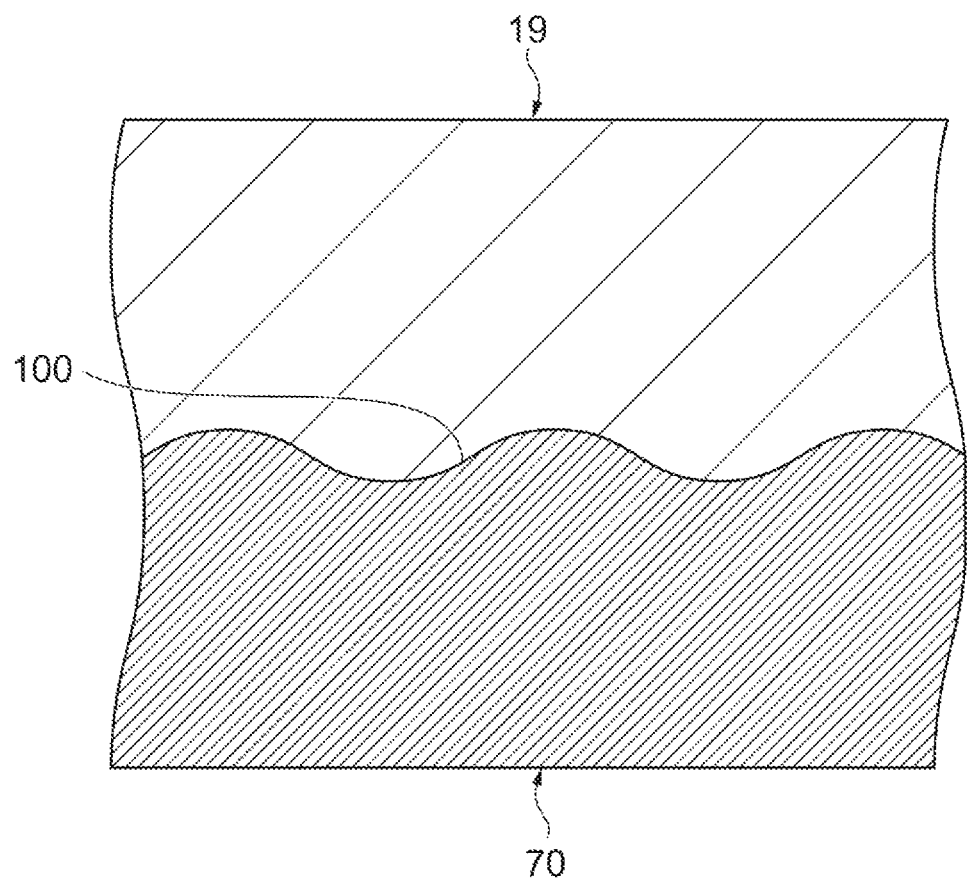
FIG. 7 is a diagram schematically illustrating a shape of a joint surface of the seal structure.

Here, the recess 19b is provided with an annular convex portion 19c which protrudes inward in the radial direction. The recess 61b is provided with an annular convex portion 61c which protrudes inward in the radial direction. The convex portion 19c and the convex portion 61c are formed in the vicinity of the gap g. As illustrated in FIG. 3B, the cylindrical member is increased in size to thereby collide with the recess 19b and the recess 61b at a high speed. As a result, the seal member 70 is deformed due to the viscoplasticity of the material to be welded to the surfaces of the recess 19b and the recess 61b. Further, as illustrated in FIG. 7, a joint surface 100 in a welded portion between the seal member 70 and the recess 19b of the proximal end portion 19 is formed in, for example, a wavy shape due to the behavior of the viscoplasticity. A joint surface in the welded portion between the seal member 70 and the recess 61b of the distal end portion 61 is also formed in, for example, a wavy shape as illustrated in FIG. 7 due to the behavior of the viscoplasticity.

The convex portion 19c and the convex portion 61c are provided to form a gap between the first end 70b of the seal member 70 and the recess 19b and a gap between the second end 70c of the seal member 70 and the recess 61b by first causing the center portion 70a of the seal member 70 in the axial direction X to contact the convex portions 19c and 61c. The center portion 70a of the seal member 70 comes into contact with the convex portion 19c and the convex portion 61c while the seal member 70 is welded or joined, but is not welded. Only the first end 70b and the second end 70c of the seal member 70 are welded to the bottom portions of the recess 19b and the recess 61b. According to the electromagnetic welding method accompanying such expansion welding, a minute gap is not easily formed in the welded portion and the sealing property of the gap g can be improved.

The bonding of the seal member 70 can be appropriately incorporated in the assembly process of the variable capacity type turbocharger 1. For example, the variable nozzle unit 40 may be attached to the bearing housing 31, the turbine housing 11 may be attached, and then the seal member 70 may be joined. Alternatively, the variable nozzle unit 40 may be attached to the turbine housing 11, the seal member 70 may be attached, and then these integrated components may be attached to the bearing housing 31.

According to the variable nozzle unit 40 of the embodiment, it is possible to change a passage area of a gas (an exhaust gas or the like) between the first nozzle ring 42 and the second nozzle ring 43 by the variable nozzle 41. The distal end portion 61 of the shroud portion 60 of the second nozzle ring 43 and the proximal end portion 19 of the outlet wall portion 18 of the turbine housing 11 face each other with the gap g interposed therebetween in the axial direction X. Since the outer peripheral portion of the gap g faces the scroll passage 13, a gas can intrude from the scroll passage 13 into the gap. When the intruding gas passes through the gap, the gas bypasses the variable nozzle 41 and the turbine wheel 12. However, according to the seal structure S, an annular seal member 70 is disposed at the inner peripheral portion of the gap g. Since the seal member 70 comes into contact with the proximal end portion 19 of the outlet wall portion 18 and the distal end portion 61 of the shroud portion 60 to block the gap g, it is possible to prevent a gas from passing through the gap g at the inner peripheral portion. Thus, the sealing performance between the second nozzle ring 43 and the turbine housing 11 is improved. In this way, since the seal structure S prevents a gas from bypassing both of the variable nozzle 41 and the turbine wheel 12, it is possible to prevent the passage of the gas without doing any work. As a result, the deterioration of the turbine performance of the variable capacity type turbocharger 1 is suppressed.

In the conventional seal structure, for example, a seal ring or a piston ring is used, but in the seal structure S, the sealing performance is improved as compared with the conventional seal structure. Further, a structure in which the outlet wall portion 18 includes the shroud portion is conventionally known. In that case, a seal member can be provided between the outlet wall portion 18 and the second nozzle ring 43 (not including the shroud portion 60). In such a structure, since the seal member is provided, the dimensional accuracy of the outlet wall portion 18 and the second nozzle ring 43 becomes important and hence manufacturing disadvantages occur. Further, in order to protect the seal member from a high-temperature gas, it is necessary to cover the seal member by thickening the proximal end portion 19 of the outlet wall portion 18 in a cover shape.

As compared with the conventional structure having such disadvantages, high processing accuracy is not required in the seal structure S. As a result, a processing management cost is reduced. Further, since the seal member 70 disposed at the inner peripheral side is not exposed to a high-temperature gas, the cover shape is not necessary. Since a gas contacting the seal member 70 is a gas having been used for work, the temperature is relatively low and hence the seal member 70 does not need to be protected particularly. Thus, since the shape of the outlet wall portion 18 and the shape of the shroud portion 60 are simple, the center of the cross-section (the center of the drawing) of the scroll passage 13 can be further displaced to the axis X while the shape of the scroll passage 13 is simplified. As a result, the seal structure S also contributes to a compact size of the variable capacity type turbocharger 1.

When the seal member 70 is welded, it is possible to reliably exhibit a sealing effect by the seal member 70 for both of the outlet wall portion 18 and the shroud portion 60. Thus, sealing performance is further improved.

Since the seal member 70 is located at the downstream side in relation to the shroud end 15c of the trailing edge 15b of the blade portion 15, a leaking flow generated in a region facing the tip 15d of the blade portion 15 is not easily influenced by the shape of the position provided with the seal member 70. Accordingly, performance deterioration is prevented and an adverse influence on aerodynamic performance is reduced.

Since the seal member 70 is received in the recesses 19b and 61b, a flow coming out of the turbine wheel 12 is not disturbed. Accordingly, performance deterioration is prevented and an adverse influence on aerodynamic performance is reduced. In particular, when the inner peripheral surface of the seal member 70 is smoothly continuous to a portion other than the recesses 19b and 61b of the inner peripheral surface 19a and the inner peripheral surface 61a, a step is reduced and hence this is advantageous aerodynamically. For that reason, the inner peripheral surface of the seal member 70 may not protrude in relation to a portion other than the recesses 19b and 61b of the inner peripheral surface 19a and the inner peripheral surface 61a and may be received in a range of the depth of the recesses 19b and 61b.

Since the seal member 70 comes into contact with the convex portions 19c and 61c and the seal member 70 also comes into contact with the bottom portions of the recesses 19b and 61b, it is possible to reliably exhibit a sealing effect by the seal member 70. Thus, sealing performance is further improved. When the seal member 70 is welded according to the electromagnetic welding method, sealing performance can be remarkably improved.

Figure 4:
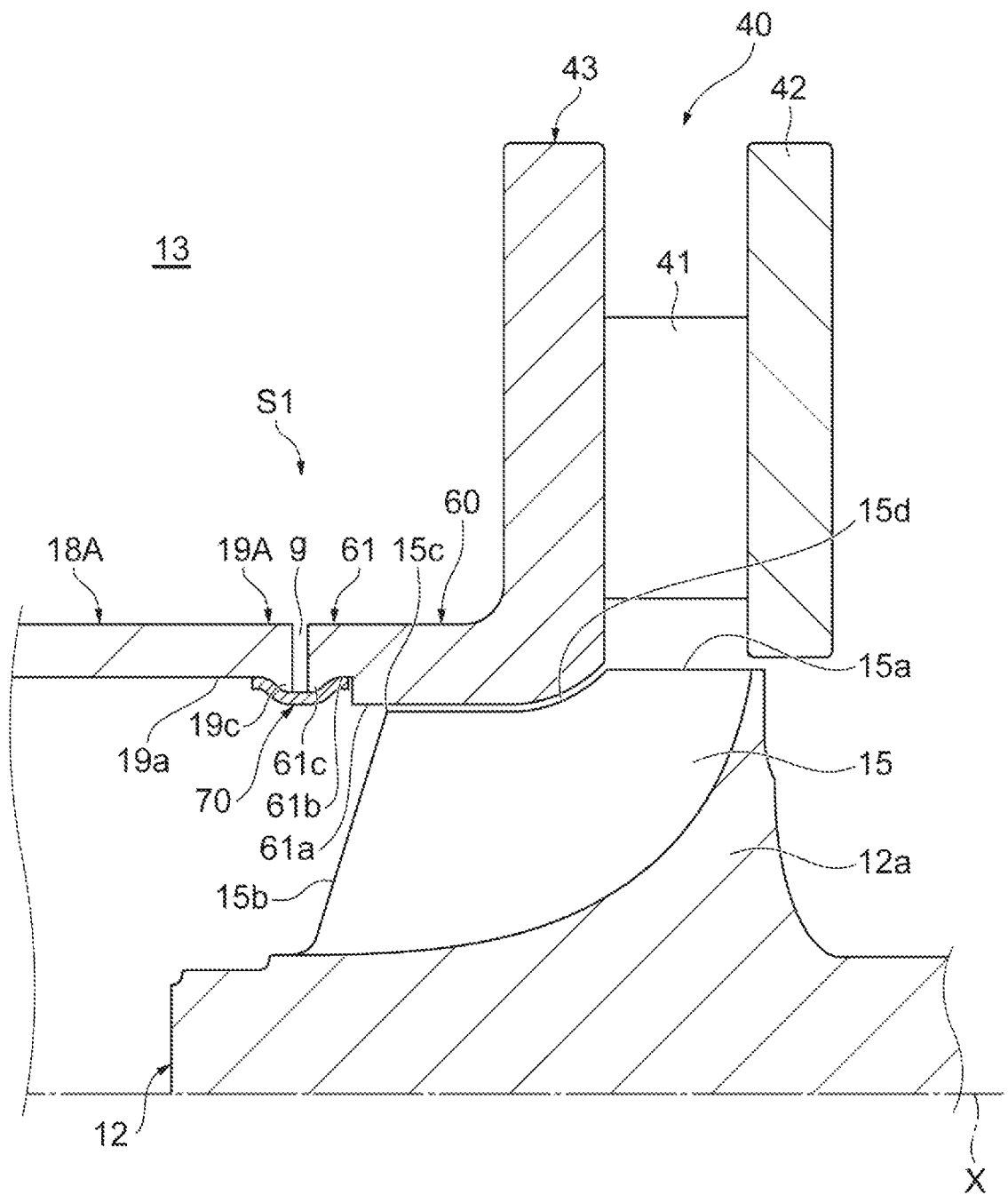
FIG. 4 is an enlarged cross-sectional view illustrating a seal structure according to a first modified example and its peripheral portion.

The embodiment of the disclosure has been described, but the disclosure is not limited to the above-described embodiment. The disclosure can include various modified examples. For example, as illustrated in FIG. 4, as the modified example, a seal structure S1 in which a recess is not provided in a proximal end portion 19A of an outlet wall portion 18A may be also employed. In this case, a step is formed in the diameter of the outlet passage 16 between the upstream side and the downstream side of the seal member 70. An influence of this step on aerodynamic performance is relatively small.

Figure 5:
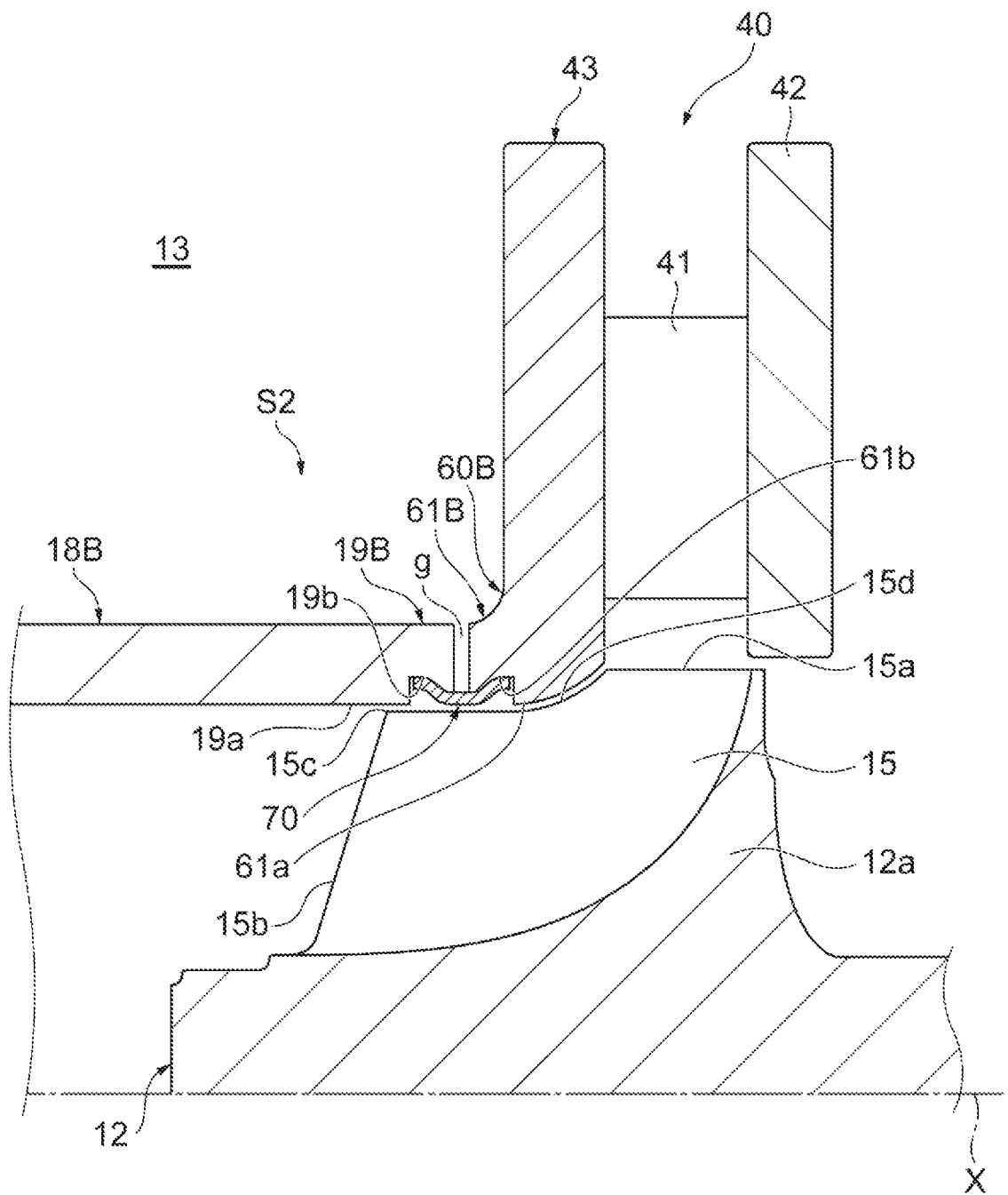
FIG. 5 is an enlarged cross-sectional view illustrating a seal structure according to a second modified example and its peripheral portion.

As illustrated in FIG. 5, as the modified example, a seal structure S2 in which a distal end portion 61B of a shroud portion 60B faces the tip 15d of the blade portion 15 and a proximal end portion 19B of an outlet wall portion 18B faces the tip 15d may be also employed. In this case, the gap g, the recesses 19b and 61b, and the seal member 70 are located at the upstream side in relation to the shroud end 15c of the trailing edge 15b of the blade portion 15. The shroud portion 60B faces a first portion of the tip 15d and the outlet wall portion 18B faces a second portion of the tip 15d. The seal member 70 also faces the tip 15d, but the seal member 70 is received in a range of the depth of the recesses 19b and 61b so that a predetermined clearance is secured.

Figure 6:
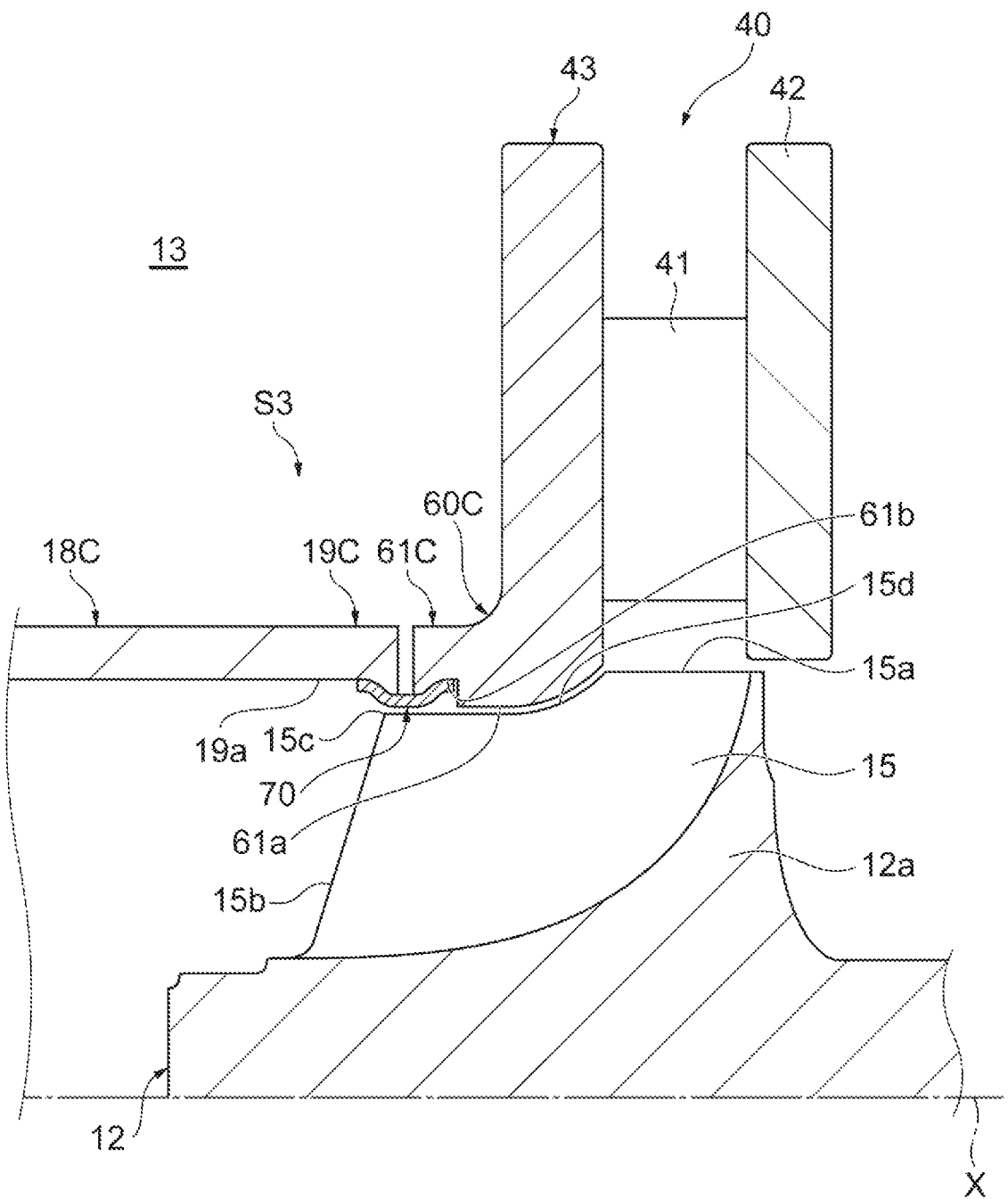
FIG. 6 is an enlarged cross-sectional view illustrating a seal structure according to a third modified example and its peripheral portion.

As illustrated in FIG. 6, as the modified example, a seal structure S3 in which the gap g is provided in the vicinity of the shroud end 15c of the trailing edge 15b may be also employed. The distal end portion 61C of the shroud portion 60C faces the tip 15d of the blade portion 15 and a small portion of the proximal end portion 19C of the outlet wall portion 18C faces the tip 15d. In this case, the gap g and the recess 61b are located at the upstream side in relation to the shroud end 15c of the trailing edge 15b of the blade portion 15. The recess 19b and the seal member 70 face the shroud end 15c of the trailing edge 15b.

As the modified example, a seal structure in which the recess is not provided in any one of the proximal end portion 19 of the outlet wall portion 18 and the distal end portion 61 of the shroud portion 60 may be also employed. In that case, the seal member 70 protrudes inward in the radial direction from the inner peripheral surface 19a and the inner peripheral surface 61a. In that case, the seal member 70 is provided at the downstream side in relation to the shroud end 15c of the trailing edge 15b. The inner diameter of the outlet wall portion 18 can be increased toward the downstream side.

In the present specification, the "annular shape" includes a circular ring which is continuous in the range of 360° without a break and a ring shape (that is, a shape having a first end and a second end) with a break. That is, the annular seal member is not limited to the seal member 70 without a break. The seal member 70 with a break may be used as the annular seal member and a region smaller than 360° at the inner peripheral portion of the gap g may be blocked by the seal member 70. Further, the seal member 70 is provided in a region of 360° or more and both end portions of the seal member 70 may overlap in a part of the circumferential direction. The "annular shape" has the same meaning as the "ring shape".

The seal member 70 may be joined by a method other than the electromagnetic welding method. The seal member 70 may be joined by, for example, arc welding, gas welding, brazing, or the like. In that case, the convex portion 19c or the convex portion 61c can be omitted. The seal member 70 may be formed in a cylindrical shape in a joined state.

INDUSTRIAL APPLICABILITY

According to some aspects of the disclosure, it is possible to improve sealing performance between the turbine housing and the second nozzle ring including the shroud portion.

REFERENCE SIGNS LIST

1: variable capacity type turbocharger, 10: turbine, 11: turbine housing, 12: turbine wheel 12a: hub portion, 13: scroll passage, 15: blade portion, 15a: leading edge, 15b: trailing edge, 15c: shroud end, 15d: tip, 16: outlet passage, 18, 18A, 18B, 18C: outlet wall portion, 19, 19A, 19B, 19C: proximal end portion, 19a: inner peripheral surface, 19b: recess, 19c: convex portion, 20: compressor, 40: variable nozzle unit, 41: variable nozzle, 42: first nozzle ring, 43: second nozzle ring, 60, 60B, 60C: shroud portion, 61, 61B, 61C: distal end portion, 61a: inner peripheral surface, 61b: recess, 61c: convex portion, 70: seal member, g: gap, S, S1, S2, S3: seal structure.

The invention claimed is:

1. A seal structure of a variable nozzle unit that is disposed between a turbine wheel and a scroll passage inside a turbine housing, the variable nozzle unit including a first nozzle ring which is disposed near a compressor in relation to a blade portion of the turbine wheel in an axial direction of the turbine wheel inside the turbine housing; a second nozzle ring which is disposed to face the scroll passage and to face the first nozzle ring in the axial direction inside the turbine housing; and a plurality of variable nozzles which are disposed between the first nozzle ring and the second nozzle ring, the seal structure comprising:

a cylindrical outlet wall portion which is provided in the turbine housing and forms an outlet passage at a downstream side of the turbine wheel;

an annular shroud portion which is provided in the second nozzle ring to face the blade portion, wherein a gap is interposed between a proximal end portion of the outlet wall portion and a distal end portion of the shroud portion; and an annular seal member that comes into contact with the proximal end portion of the outlet wall portion and the distal end portion of the shroud portion to block the gap, wherein a width of the annular seal member in the axial direction is larger than a width of the gap in the axial direction, wherein the proximal end portion of the outlet wall portion includes a first inner peripheral surface facing in a radial direction that is perpendicular to the axial direction, and the distal end portion of the shroud portion includes a second inner peripheral surface facing in the radial direction, and wherein the annular seal member contacts the first inner peripheral surface of the proximal end portion of the outlet wall portion and contacts the second inner peripheral surface of the distal end portion.

2. The seal structure of the variable nozzle unit according to claim 1, wherein the distal end portion of the shroud portion protrudes toward the downstream side in the axial direction in relation to a shroud end of a trailing edge of the blade portion, and wherein the seal member is located at the downstream side in relation to the shroud end.

3. The seal structure of the variable nozzle unit according to claim 1, wherein first inner peripheral surface and the second inner peripheral surface face toward the turbine wheel in the radial direction.

4. The seal structure of the variable nozzle unit according to claim 1, wherein the annular seal member is partially embedded in the distal end portion of the shroud portion.

5. The seal structure of the variable nozzle unit according to claim 1, wherein the annular seal member is partially embedded in the proximal end portion of the outlet wall portion and is partially embedded in the distal end portion of the shroud portion.

6. The seal structure of the variable nozzle unit according to claim 1, wherein the annular seal member is at least partially disposed outside of the gap in a radial direction and extends into a notch formed in the distal end portion of the shroud portion.

7. The seal structure of the variable nozzle unit according to claim 1, wherein the annular seal member is disposed outside of the gap in a radial direction and extends into a notch formed in the distal end portion of the shroud portion.

8. The seal structure of the variable nozzle unit according to claim 1, wherein the annular seal member is disposed outside of the gap in a radial direction and extends into a first notch formed in the proximal end portion of the outlet wall portion and extends into a second notch formed in the distal end portion of the shroud portion.

9. The seal structure of the variable nozzle unit according to claim 1,
   wherein at least one of the first inner peripheral surface of the proximal end portion of the outlet wall portion and the second inner peripheral surface of the distal end portion of the shroud portion is provided with a recess, and
   wherein at least a part of the seal member is disposed in the recess.

10. The seal structure of the variable nozzle unit according to claim 9,
    wherein the recess is provided with a convex portion which protrudes inward in a radial direction.

11. A variable capacity type turbocharger comprising:
    the seal structure of the variable nozzle unit according to claim 1,
    wherein the variable nozzle unit is attached into the turbine housing with the seal structure.

12. A seal structure of a variable nozzle unit that is disposed between a turbine wheel and a scroll passage inside a turbine housing, the variable nozzle unit including a first nozzle ring which is disposed near a compressor in relation to a blade portion of the turbine wheel in an axial direction of the turbine wheel inside the turbine housing; a second nozzle ring which is disposed to face the scroll passage and to face the first nozzle ring in the axial direction inside the turbine housing; and a plurality of variable nozzles which are disposed between the first nozzle ring and the second nozzle ring, the seal structure comprising:
    a cylindrical outlet wall portion which is provided in the turbine housing and forms an outlet passage at a downstream side of the turbine wheel;
    an annular shroud portion which is provided in the second nozzle ring to face the blade portion, a proximal end portion of the outlet wall portion and a distal end portion of the shroud portion face each other with a gap interposed therebetween in the axial direction; and
    an annular seal member that is disposed at an inner peripheral portion of the gap in a radial direction and comes into contact with the proximal end portion of the outlet wall portion and the distal end portion of the shroud portion to block the gap,
    wherein the seal member is welded to the proximal end portion of the outlet wall portion and the distal end portion of the shroud portion.

13. A seal structure of a variable nozzle unit that is disposed between a turbine wheel and a scroll passage inside a turbine housing, the variable nozzle unit including a first nozzle ring which is disposed near a compressor in relation to a blade portion of the turbine wheel in an axial direction of the turbine wheel inside the turbine housing; a second nozzle ring which is disposed to face the scroll passage and to face the first nozzle ring in the axial direction inside the turbine housing; and a plurality of variable nozzles which are disposed between the first nozzle ring and the second nozzle ring, the seal structure comprising:
    a cylindrical outlet wall portion which is provided in the turbine housing and forms an outlet passage at a downstream side of the turbine wheel;
    an annular shroud portion which is provided in the second nozzle ring to face the blade portion, wherein a gap is interposed between a proximal end portion of the outlet wall portion and a distal end portion of the shroud portion; and
    an annular seal member that comes into contact with the proximal end portion of the outlet wall portion and the distal end portion of the shroud portion to block the gap,
    wherein a width of the annular seal member in the axial direction is larger than a width of the gap in the axial direction, and
    wherein the annular seal member is at least partially disposed outside of the gap in a radial direction and extends into a first notch formed in the proximal end portion of the outlet wall portion and extends into a second notch formed in the distal end portion of the shroud portion.

* * * * *